United States Patent [19]

Claessen

[11] Patent Number: 4,678,694
[45] Date of Patent: Jul. 7, 1987

[54] ANTISTATIC CARPET TILE AND METHOD OF MANUFACTURING SUCH CARPET TILE

[75] Inventor: Johannes A. H. Claessen, Leusden, Netherlands

[73] Assignee: Heuga Holding b.v., Scherpenzeel, Netherlands

[21] Appl. No.: 848,775

[22] Filed: Apr. 7, 1986

[51] Int. Cl.⁴ .............................................. B32B 3/00
[52] U.S. Cl. ...................................... 428/95; 427/58; 427/122; 427/123; 427/126.1; 427/209; 427/289; 427/290; 427/316; 427/372.2; 428/922
[58] Field of Search .................. 428/95, 922; 427/122, 427/58, 123, 126, 209, 289, 290, 316, 372 R, 385 R

[56] References Cited

U.S. PATENT DOCUMENTS 4,101,689  7/1978  Wienand ............................ 428/922

*Primary Examiner*—Marion C. McCamish
*Attorney, Agent, or Firm*—Richard P. Crowley

[57] ABSTRACT

An antistatic or electrically conductive carpet tile and a method of producing such carpet tile, which method comprises forming a plurality of separate columns of electrically conductive material, extending generally perpendicularly between the back surface of the carpet tile and the face of the carpet tile, the electrically conductive columns formed in a nonelectrically conductive thick backing layer, so as to provide an electrically conductive path from the face of the carpet to ground. An antistatic carpet which comprises a fibrous face secured to a primary backing layer, an electrically conductive precoating layer on the backing layer, and a nonelectrically conductive backing layer and a plurality of columns of electrically conductive material, such as electrically conductive polymeric ink, extending from the back surface of the carpet tile to the nonelectrically conductive backing layer and into contact with the electrically conductive precoat layer or face.

34 Claims, 2 Drawing Figures

ANTISTATIC CARPET TILE AND METHOD OF MANUFACTURING SUCH CARPET TILE

BACKGROUND OF THE INVENTION

Floor-covering materials, such as carpet tile, can contribute to the buildup of high static electrical charges, as a result of the motion of people to walking or to the movement of furniture or other objects in contact with the floor-covering materials. Abrupt discharges of such accumulated static charges on the floor-covering material may cause discomfort to personnel, and also may cause malfunction of computer or electronic equipment. Static buildup and discharge may be minimized by providing a conductive path from the face surface of the carpet to the electrical ground, and assuring that the resistance for the floor surface material; that is, the bulk resistance and surface resistivity, is within defined standards, such as those standards required by computer and electronic manufacturers, for the protection of sensitive computer, electronic and microchip-containing equipment. Typically, such standards require a minimum of $5 \times 10^5$ ohms and a maximum of $2 \times 10^{10}$ ohms in surface and bulk resistivity. In addition, there is often a desirable minimum resistivity for safety of $10^3$ to $10^4$ ohms.

Carpet materials, particularly carpet tile, have been developed to prevent the formation of static charges or the accumulation of static charges and which permit the rapid dissipation of such charges without danger to personnel or equipment; however, to date such floor-covering materials have not been wholly satisfactory. Antistatic floor-surface materials may be produced by applying an antistatic topical agent to the face of the floor covering; however, such antistatic treatments typically are not permanent and can contribute to soiling characteristics of the floor covering, and further usually are not very effective in low humidity and relative humidity conditions. Permanent electrical conductivity or electrical static conductivity in a fibrous floor coverings may be produced by incorporating conductive fiber or yarn elements into the face of the floor covering, such as the carpet tile. Such conductive fibrous elements may comprise, for example, fine, thin, metal wires or metallic-coated wires as yarn elements, or be composed of carbon-containing, such as carbon-filled, core yarns or fibers incorporated into the nonconductive face fibers or yarns. Such permanent protection often provides both low static generation from the interaction between the face of the carpet and people and objects, and also electrical conductivity across the face of the carpet. However, electrically conductive fiber faces, by themselves, do not insure efficient electrical conductivity through the face of the carpet; that is, acceptable transmission or bulk resistivity (also called volume resistivity).

Carpet tile has been produced wherein static charges generated are dissipated very rapidly through the employment of electrically conductive fiber or yarn elements incorporated in the fibrous face of the carpet and anchoring the fibrous face of the carpet and these elements to a primary backing, through the employment of an electrically conductive precoat or backing layer. Typically, such electrically conductive precoat comprises a polymeric material, such as a styrene-butadiene latex incorporating therein electrically conductive agents, such as metallic particles or more particularly dispersed finely-divided carbon-black particles, in order to provide for increased electrical conductivity. Such carpet tile and other carpet material also require a relatively thick backing layer, to insure dimensional stability of the carpet tile and the laying flat of the carpet tile in use. A wide variety of polymeric materials may be used; however, atactic polypropylene, bitumen and polyvinyl chloride resin are presently the most popular materials used in the backing of commercial carpet tile. Such materials are essentially nonelectrically conductive and, therefore, do not permit an easy pathway for electrical charges to the ground or to the back of the carpet tile.

Generally, the employment of antistatic or electrically conductive agents into the relatively thick backing layer, such as the employment of particulate particles, such as carbon-black particles, with a polymeric backing material, has not proven to be satisfactory, since the amount of carbon black required for the desired electrical conductivity or antistatic effect provides for a significant increase in viscosity and often otherwise affects the chemical properties of the backing. Also, the employment of other antistatic additives, such as, for example, metal fatty-acid soaps, glycols and the like, where incorporated into the backing material, often modifies and changes the chemical and mechanical properties of the backing, resulting in unsatisfactory specifications or properties. For example, the employment of stearates within a solid bitumen backing, employed for the preparation of carpet tile, often affects the adhesive qualities of the bitumen and further weakens the mechanical properties of the bitumen or bitumen-filler; for example, limestone, backing material. Carpet tiles and a method of manufacturing carpet tiles are set forth in British Patent No. 2057353B, published Mar. 28, 1984, hereby incorporated by reference.

Thus, it is desirable to provide a more effective and improved antistatic, electrically conductive, fibrous-face, surface-coating material, particularly a carpet tile, with improved electrical conductivity, and which material avoids the disadvantages associated with the prior-art surface materials and methods of production.

SUMMARY OF THE INVENTION

The invention relates to an antistatic or improved electrically conductive, fibrous-face, surface-coating material and to a method of preparing and employing such material. In particular, the invention concerns an antistatic carpet tile and a method of manufacturing and employing such carpet tile, particularly for use in those industrial and office environments, such as the computer and electronic industry, to prevent damage to sensitive computer and electronic equipment.

The antistatic electrically conductive carpet or surface coating of the invention comprises a fibrous face surface and a backing layer, and wherein there is a plurality of columns of electrically conductive material extending from the back surface of the carpet through the backing layer toward or into the bottom face of the carpet, so as to provide an electrical pathway from the back face of the carpet to the back surface of the carpet through such island-type columns of such electrically conductive material.

In particular, the invention concerns an antistatic carpet tile, wherein the carpet tile has a fibrous face which is secured to a primary backing sheet, typically a nonwoven polypropylene, a polyester, jute or glass-fiber or other sheet material used as a primary backing, and a precoating layer, which secures or aids in securing the fibrous face to the back surface of the primary backing sheet. The carpet includes a relatively thick solid or foam, or combination, backing layer which may be formed of one or several layers, and which also may contain therein a glass-fiber sheet or other dimensionally stable sheet material. Optionally a secondary backing layer is secured to the back surface of the backing layer, such as a polyester or other sheet material.

The carpet tile contains a plurality of spaced-apart columns of electrically conductive material formed in the backing layer and extending from the back surface of the carpet tile toward and generally into the precoat layer and back of the primary backing sheet, to provide an electrical path from the back face of the surface to the back surface of the carpet, so as to enhance the electrical conductivity and to provide an improved transmission or bulk resistivity of less than $1 \times 10^{10}$ ohms per square, and typically $1 \times 10^6$ or lower ohms per square.

Optionally, but desirably, the antistatic carpet tile also may contain on the back surface one or more layers of an electrically conductive material, such as a thin coating layer or strips, connecting the electrically conductive columns on the back surface of the carpet tile, and generally extending across the entire back surface of the carpet tile, to form an electrically conductive strip connecting the spaced-apart ends of the columns across the back surface of the carpet tile. The electrically conductive layer or strip also may be composed of an electrically conductive adhesive layer which secures the carpet to the floor.

In a more particular and preferred embodiment, the antistatic carpet of the invention comprises a carpet tile, wherein the fibrous face surface contains electrically conductive fibers or yarns, wherein the precoat is an electrically conductive precoat; that is, contains carbon particles or metallic particles or other antistatic additives, and wherein one end of the electrically conductive columns extends into the precoat and the other end extends generally perpendicular to the back surface of the carpet to the electrically conductive strip or back surface of the carpet. While electrically conductive or antistatic additives may, in fact, be applied topically to the face of the carpet or incorporated into the backing layer or to any of the sheet materials employed in the carpet, typically the backing layer is electrically nonconductive or unsatisfactorily conductive, so that the plurality of islands of electrically conductive materials, such as generally uniformly spaced across one dimension of the carpet tile, provides an effective electrical pathway to ground.

An antistatic and effective electrically conductive carpet suitable for use in the computer and electronic industry, and having a bulk resistivity of less than about $1 \times 10^8$ ohms per square, is provided through the employment of a carpet tile having a fibrous face of synthetic fibers, such as polyester, nylon or the like, which contains a needle-punched, fusion-bonded or other tufted fiber, and which fibrous face has or contains some fine stainless-steel yarns or carbon-core synthetic yarns, to impart electrical conductivity to the face of the carpet. Such fine stainless-steel yarns may be coated for enhanced electrical conductivity, and also may compose carbon-filled polymeric fibers; for example, in the amount of about one electrically conductive yarn to 6 to 12 to the nonelectrically conductive fibers. Such a carpet tile also would include a primary backing sheet, such as of nonwoven polypropylene, and wherein an electrically conductive precoat is employed to aid in securing the fibers to the primary backing sheet, such as, for example, a styrene-butadiene latex layer. The latex precoat may contain carbon particles in an amount to impart electrical conductivity to the thin precoat layer; for example 5 to 40 ounces per square yard, and to provide an electrical conductivity of generally less than $1 \times 10^8$ ohms per square.

The carpet tile also includes a relatively thick layer of a solid polymeric backing layer, such as of bitumen, or a bitumen-filler admixture, such as the use of fine-particle limestone with the bitumen; for example, in an amount of 10 to 150 ounces per square yard, and more particularly 30 to 120 ounces per square yard, is used. Optionally, the backing layer may contain therein a tissue or scrim of glass or a synthetic fiber, such as polyester, to provide dimensional stability to the carpet tile. The bitumin or limestone-filled bitumin and other polymeric backings are essentially nonelectrically conductive. The carpet tile also generally contains on its back surface a secondary backing, such as a woven polyester layer, so that the carpet tile may be secured easily to the ground or be laid on the surface on installation.

The carpet tile of the invention includes a series of solid columns of electrically conductive material, typically of an electrically conductive ink-type polymeric material, such as waterbased or a volatile organic solvent-based ink containing fine carbon particles therein. The carpet contains the columns of electrically conductive ink extending from the precoat layer, which is usually electrically conductive, or from the back of the primary layer to the back surface or, optionally, to the back surface of the secondary backing sheet. The columns are spaced apart and aligned, although they may vary, and may be uniformly spaced, for example 1 to 6 inches, but more typically $\frac{1}{2}$ to 2 inches, apart across one substantial length of the carpet tile; that is, from one edge to another. Optionally, but preferred, the straight spaced-apart ends of the columns of electrically conductive material, extending across the back surface of the secondary backing sheet, may be connected by a thin strip of electrically conductive material, such as a thin coating strip of a material containing carbon-black particles, such as an SBR latex or an electrically conductive ink. This electrically conductive coating layer or strip generally should extend across the entire surface of the carpet tile and connect the ends of these columns which form islands on the back surface of the carpet tile and run to the edge of the carpet tile. Instead of a coating strip, the electrical path to ground may comprise the use of electrically conductive adhesives used to secure the back surface of the carpet to the base floor. The carpet tiles of the invention, when employed in a computer room or a room with electronic equipment, provides for enhanced electrical bulk resistivity of $1 \times 10^8$ or less ohms per square, and typically $1 \times 10^6$ or less ohms per square, and promote the rapid dissipation of static charges from the electrically conductive fibrous face, through the electrically conductive precoat layer, through the electrically conductive columns in the nonelectrically conductive thick backing layer and through the electrically conductive strip or coating on the back surface of the columns and then to ground. Where desired, the carpet tile may contain the columns generally spread in a straight line, a zig-zag line or essentially nonuniformly or uniformly distributed across the entire back surface of the carpet. There may be one or more or even a grid work of electrically conductive strips connecting such columns, where a high antistatic-type carpet tile is desired.

The polymeric material used in the backing layer comprises a wide variety of hot-melt or thermoplastic-type polymeric materials, to include, but not be limited to: bitumen, vinyl-chloride resins, atactic polypropylene, urethanes and ethylene vinyl-acetate resins. These polymers may contain various additive agents, such as plasticizers, flame retardants, curing agents, viscosity index agents, etc., as well as filler materials, such as talc, limestone, diatomaceous earth, etc. The bitumen employed comprises a petroleum-derived bitumen or asphalt material which is not derived from or does not contain carcinogenic coal tar derivatives and which is suitable for use as a hot-melt-type carpet backing material.

The invention also comprises a method of manufacturing the antistatic or electrically conductive surface coating, such as a carpet tile having a fibrous face, and which method comprises forming a plurality of spaced-apart thin columns of electrically conductive material, such as electrically conductive carbon-containing polymeric ink material, extending from the back surface of the backing layer to the precoat or into the back surface of the primary backing of the carpet material, so as to provide an electrically conductive pathway from the face of the surface-coating material to the back, and to provide improved bulk transmission. The thin columns of electrically conductive material are typically easily formed by penetrating the backing layer with one or more spike or needle-like elements containing the electrically conductive material to be deposited and to form said thin columns in the backing layer. For example, the thin columns may be formed by coating the surface of one or more spike-like elements mounted on a rotatable wheel or on a reciprocating member with an electrically conductive drying liquid, such as an electrically conductive carbon-containing ink, and then penetrating the back surface of the backing layer of the carpet with the spike-like or needle-like elements of defined length, so as to extend into the precoat layer or to the back surface of the primary sheet of the carpet tile. The electrically conductive columns are formed, when the needle-like or spike-like element is withdrawn, and the electrically conductive material is deposited as a column in the penetration hole. Generally, after withdrawal of the needle-like or spike-like elements, the elements are recoated with electrically conductive material and are again employed in penetrating the back surface of the backing layer. Generally, where a rotating wheel, containing a plurality of spike-like or needle-like elements, is employed, the columns are formed in a discontinuous, but defined, straight path generally across substantially the entire back surface of the carpet tile.

The method also comprises coating the back surface of the carpet tile with an electrically conductive coating layer, strip or adhesive, to connect the ends of the thin columns on the back surface. Generally, the coating may only comprise a strip which connects the ends of the columns on the back surface of a carpet tile, but may, of course, if desired, be an electrically conductive coating layer which covers the entire or a part of the surface of the back of the carpet, either prior to or after the installation of the secondary backing layer. In one method of operation, the carpet tile is carried with the fibrous face down or up, and a rotating wheel, containing needle-like elements of defined length to reach into the precoat, is then rotated by the lateral movement of the carpet tile on the support layer, so that the needle-like elements penetrate the back surface of the backing layer in a defined pattern, and, after such penetrating, withdrawing and depositing of the electrically conductive ink, the surface of the needle-like elements are again recoated and the pattern repeated. Since the electrically conductive ink is generally of a dark color, due to the carbon-black particles, the needles should not penetrate to the face of the carpet, to avoid face-fiber discoloration.

The antistatic electrically conductive surface coating, particularly a carpet tile, of the invention and the method of preparation avoid many of the difficulties associated with prior-art techniques, and provide for a superior surface coating and more particularly a carpet tile, having a solid electrically nonconductive backing layer, of improved electrical resistivity.

The invention will be described for the purposes of illustration only in connection with the preparation of an antistatic carpet tile; however, it is recognized that the invention is equally applicable to the preparation of a wide variety of antistatic surface-coating materials, and that various improvements, changes, modifications and additions may be made, by those persons skilled in the art, from the illustrated embodiments, but all falling within the spirit and scope of the invention.

DESCRIPTION OF THE EMBODIMENTS

Figure 1:
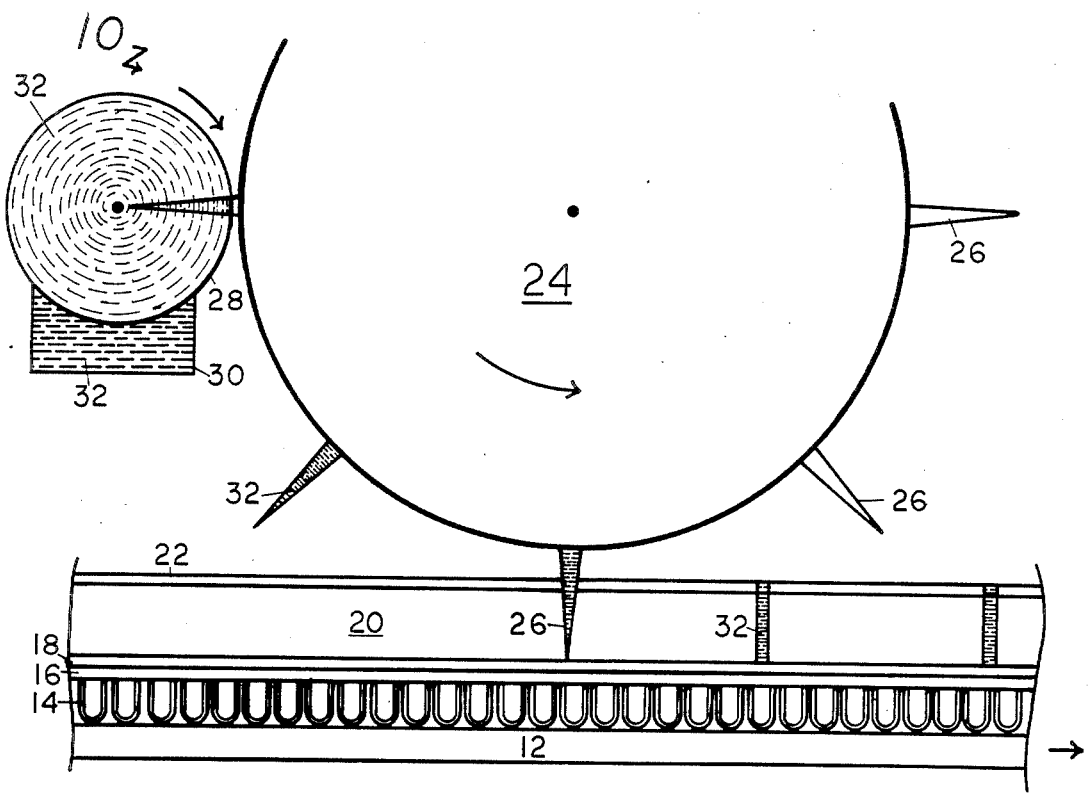
FIG. 1 is a schematic, illustrative, partially sectional view of the method of preparing the electrically conductive carpet tile of the invention.

The drawings show a carpet tile 10 with a tufted fibrous face, such as of nylon or other synthetic polymer, interwoven with electrically conductive yarns 14, with the fibrous face on a support belt 12. The fibers 14 are secured to a polyester primary backing sheet and are secured in place through the employment of an electrically conductive precoat SBR latex layer 18 containing electrically conductive carbon black particles. A bitumen limestone backing 20 is secured to the precoat layer 18, while a secondary backing sheet 22; for example, of polyester fibers, is secured to the back surface of the bitumen backing layer 20.

As illustrated more particularly in FIG. 1, a rotating wheel 24 is placed above the carpet tile 10 on the moving support sheet 12, which wheel 28 contains, on its periphery, a plurality of uniformly spaced-apart spike-like or needle-like elements 26. A foam roll coater 28, composed of an open-cell foam material, is disposed for rotating through a pan containing a conductive liquid ink material 32. The forward movement of the carpet 10 on the belt 12 permits the free movement of the rotatable wheel 24 about its axis with the spikes 26. On rotation of the wheel 24, the spikes pass into the open-cell foam layer 28, saturated with the conductive liquid 32 from the pan 30, so that the outer surfaces of the spikes 26 are coated. Movement of the carpet tile 10 on the support layer brings the spikes into penetrating contact with the back surface of the carpet tile 10. The conductive liquid end-coated spikes 26 penetrate the secondary backing 22, the bitumen 20 and extend into the electrically conductive precoat layer 18 and deposit the electrically conductive ink in the penetration hole 36 on withdrawal, to form an electrically conductive column 32, which provides an electrical pathway from the electrically conductive precoat layer 18 to the back surface of the secondary backing layer 22.

Rotation of the wheel provides for a plurality of columns of electrically conductive material 32 in a predefined, spaced-apart, straight-line arrangement across the entire back surface of the carpet tile 10 to a defined depth to the precoat layer; for example, reaching, depending on the thickness of the back coating and the precoat, from about 30 to 150 mils, and more particularly 60 to 120 mils. As illustrated more particularly in FIG. 2, an electrically conductive layer; for example, of an electrically conductive ink, is coated onto the back surface of the carpet 10, to form a dried electrically conductive strip 34 across the entire back surface of the carpet, and connecting the ends of the columns 32 on the secondary backing layer 22.

Figure 2:
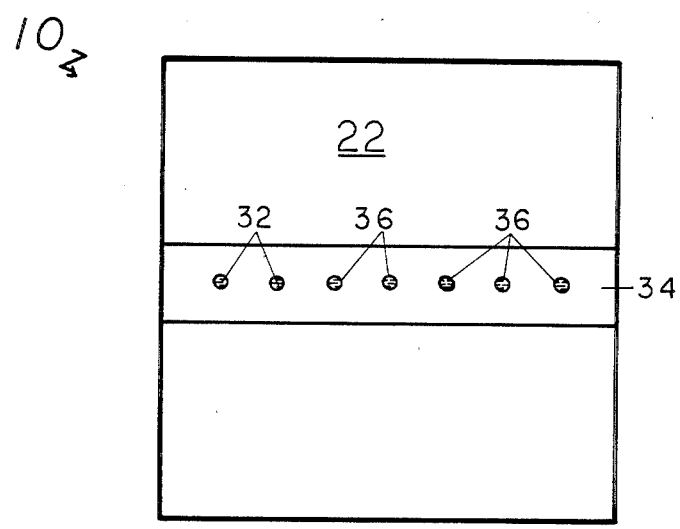
FIG. 2 is a plan back view of the carpet tile of FIG. 1.

The carpet as prepared in FIGS. 1 and 2 is then employed by placing the carpet on the ground and, if desired, may be electrically connected by wires in the ground to ground or by electrically conductive adhesives, but more typically is merely laid on the ground surface, so that, in operation, any static charges accumulating on the face surface of the carpet 14 pass through the electrically conductive fibers in the face surface 14 through the electrically conductive precoat layer and the various columns 32 and to the strip 34 and to ground.

While the improved carpet tile and method of the invention have been illustrated in the particular embodiments, it is not essential, depending on the type of electrical conductivity desired, that the fibrous face of the carpet be electrically conductive, or that the precoat be electrically conductive, since the formation of the thin columns of electrically conductive material throughout the backing layer, extending toward and into the precoat or primary sheet, is often desirable, merely to permit an electrical pathway across the face thickness of the carpet tile, and is particularly useful where the thick backing is composed of a nonelectrically conductive material and, in fact, acts as an electrical insulator for the surface-coating material, such as the bitumen or limestone-filled bitumen of the example.

What is claimed is:

1. An antistatic carpet tile having an electrical resistivity of about $1 \times 10^8$ ohms square or less, which carpet tile comprises:
   (a) an electrically conductive fibrous-face material;
   (b) a primary backing sheet, the fibrous-face material secured to the primary backing sheet;
   (c) an electrically conductive precoat layer secured to the primary backing sheet;
   (d) a polymeric electrically insulating backing layer having a back surface;
   (e) a plurality of spaced-apart thin columns of a solid electrically conductive material extending generally perpendicularly to the plane of the carpet tile face from the back surface of the backing layer through the backing layer and to the precoat layer, to provide an electrical conductivity pathway from the precoat layer to the back surface of the backing layer;
   (f) a secondary backing sheet secured to the back surface of the backing layer; and
   (g) an electrically conductive coating layer on the secondary backing sheet and connected to a plurality of the ends of the columns on the back surface, to provide an electrical pathway to the electrically conductive fibrous face, through the electrically conductive precoat layer and through said columns to ground.

2. The material of claim 1 wherein said columns are spaced apart from about ½ to 4 inches across substantially the entire length of the back surface of the floor surface material.

3. The material of claim 1 which includes an electrically conductive adhesive layer on the back surface of the backing layer, to provide an electrical pathway connecting the ends of said columns on the back surface to ground.

4. The material of claim 1 wherein the backing layer is selected from the group of polymeric materials consisting of a vinyl-chloride resin, bitumen, atactic polypropylene, ethylene vinyl-acetate resin and polyurethanes.

5. The carpet tile of claim 1 wherein the coating layer comprises a coating strip extending across the secondary backing layer from the one to other edge of said carpet tile and means to connect electrically the said coating strip to ground.

6. The carpet tile of claim 1 wherein the fibrous face surface comprises a tufted face surface.

7. A method of manufacturing an antistatic or electrically conductive surface-covering material, which surface-covering material comprises a fibrous-face layer secured to a primary backing sheet, and which surface-covering material includes an electrically nonconductive backing layer having a back surface, and which method comprises forming a plurality of spaced-apart thin columns of electrically conductive material extending generally from the back surface of the backing layer toward and generally to about the primary sheet by penetrating the backing layer with one or more spike-like elements containing said electrically conductive material to form said columns and to provide an electrically conductive pathway for static charges from the fibrous face of the surface-covering material to the back surface of the backing layer, and a surface-covering material of improved low electrical resistivity.

8. The method of claim 7 which includes penetrating the backing layer with a thin spike-like element containing an electrically conductive material, and withdrawing the thin spike-like element from the backing layer, to form the columns of electrically conductive material in the backing layer.

9. The method of claim 8 wherein the thin spike-like elements contain a coating of a liquid electrically conductive material thereon, which electrically conductive material contains electrically conductive carbon-black or metal particles.

10. The method of claim 7 wherein the fibrous face comprises an electrically conductive fibrous-face material.

11. The method of claim 7 wherein the surface-covering material includes an electrically conductive precoat layer on the back surface of the primary backing sheet, and wherein the method includes forming the thin columns extending from the back surface of the backing layer into the electrically conductive precoat layer.

12. The method of claim 7 which includes connecting a plurality of the ends of the electrically conductive materials on the back surface of the backing layer with an electrically conductive layer.

13. The method of claim 12 which includes coating an electrically conductive strip on the back surface of the backing layer to connect the electrically conductive materials extending on the back surface of the backing layer, and to form an electrical pathway for a plurality of the electrically conductive material to the strip and to ground on installation of the surface-covering material.

14. The electrically conductive carpet tile produced by the method of claim 13.

15. The method of claim 7 wherein the backing layer is selected from the group of polymeric materials consisting of a vinyl-chloride resin, bitumen, atactic polypropylene, ethylene vinyl-acetate resin and polyurethanes.

16. The method of claim 7 which includes securing the electrically conductive surface-covering material to a substrate employing an electrically conductive adhesive.

17. The method of claim 7 which includes:
(a) sequentially penetrating a plurality of spike-like elements coated with a liquid carbon-particle containing electrically conductive material into the backing layer;
(b) sequentially withdrawing the spike-like elements from the backing layer to deposit the electrically conductive material as said columns in the backing layer;
(c) inserting said withdrawn spike-like elements into an open-cell foam material impregnated with the liquid electrically conductive material; and
(d) withdrawing the spike-like elements coated with the said electrically conductive material for sequentially penetrating the said backing layer.

18. The method of claim 7 where the electrically conductive material comprises a liquid solvent, carbon black-containing conductive ink material.

19. The antistatic surface-covering material produced by the method of claim 7.

20. The antistatic surface-covering material produced by the method of claim 7 characterized by a bulk electrical resistivity of about $1 \times 10^8$ ohm-square or less.

21. A method of manufacturing an electrically conductive carpet tile, which carpet tile comprises a fibrous-face layer secured to the face of a primary backing sheet, an electrically conductive precoat layer on the back of the primary backing sheet, and a nonelectrically conductive insulating-type, relative thick backing layer secured to the precoat layer and having a back surface, the method which comprises forming a plurality of spaced-apart columns of electrically conductive material extending from the back surface of the backing layer into the electrically conductive precoat layer by penetrating the backing layer with one or more spike-like elements containing an electrically conductive liquid material thereon, the electrically conductive material forming the said column to provide an electrical pathway from the electrically conductive precoat layer to the back surface of the backing layer, and a carpet tile of improved electrical conductivity.

22. The method of claim 21 which includes: coating the surface of one or more spike-like elements with an electrically conductive liquid material; penetrating the back surface of the backing layer of the carpet with the coated spike-like elements, to deposit the electrically conductive liquid in the penetrating holes and to form said columns; and withdrawing the spike-like elements from the backing layer.

23. The method of claim 21 which includes passing the back surface of the carpet tile in a penetrating relationship with a plurality of spaced-apart spike-like elements on the surface of a rotating wheel; coating the outer surface of the spike-like elements with an electrically conductive liquid ink material; penetrating the back surface of the backing layer of the carpet with the liquid-coating spike-like elements by the rotary movement of said wheel, to form a plurality of spaced-apart, penetrating holes in the back surface of the backing layer extending to the precoat layer, and to deposit said liquid in the penetrating holes; and withdrawing, on rotation of the wheel, the uncoated spike-like elements for further coating and penetrating.

24. The method of claim 21 wherein said columns are formed in a straight-line path across substantially the entire back surface of the carpet tile.

25. The method of claim 21 wherein the said columns extend substantially across the entire back surface of the carpet in a straight line and are spaced apart in an amount of from about ½ to 4 inches.

26. The method of claim 21 wherein the fibrous face of the carpet contains electrically conductive yarns therein, to provide an electrically conductive fibrous face.

27. The method of claim 21 wherein the fibrous face of the carpet tile has been topically treated with an antistatic additive, to provide an electrically conductive fibrous face.

28. The method of claim 21 which includes placing an electrically conductive layer on the back surface of the carpet tile, to connect the ends of the columns on the back surface of the backing layer.

29. The method of claim 21 which includes a plurality of said columns arranged in a generally straight line in a defined spaced-apart relationship across the entire or substantially the entire back surface of the carpet tile, and a thin strip layer of an electrically conductive coating extending over the line of said columns and to each edge of the carpet tile.

30. The method of claim 21 wherein the electrically conductive coating layer comprises a carbon-black-containing polymer layer.

31. The method of claim 21 which includes a secondary backing sheet secured to the back surface of the backing layer.

32. The method of claim 21 wherein the backing layer is selected from the group of polymeric materials consisting of a vinyl-chloride resin, bitumen, atactic polypropylene, ethylene vinyl-acetate resin and polyurethanes.

33. The method of claim 21, which method includes supporting the fibrous face of the carpet tile on a movable supporting sheet material, and moving the supported carpet tile beneath a wheel containing a plurality of spaced-apart spike-like elements extending outwardly from the outer periphery of the wheel, the sheel positioned for rotary motion about an axis, with the spike-like elements, on movement of the wheel, penetrating the back surface of the backing layer to a defined depth to the precoat layer, and coating the spike-like elements in a sequential manner with an electrically conductive liquid ink material, and penetrating the back surface of the backing layer with the spike-like elements on movement of the carpet, to form a plurality of discontinuous, spaced-apart columns; and withdrawing the spike-like elements from the backing layer of the carpet tile, after deposition of the liquid electrically conductive material on penetration; and coating the surface of the spike-like elements withdrawn with an electrically conductive material for further penetration of the backing layer, on movement of the wheel.

34. The electrically conductive carpet tile produced by the process of claim 21.

* * * * *